United States Patent

[11] 3,601,930

| [72] | Inventor | Edward G. Robillard<br>Cherry Valley, Mass. |
|---|---|---|
| [21] | Appl. No. | 877,092 |
| [22] | Filed | Nov. 17, 1969 |
| [45] | Patented | Aug. 31, 1971 |
| [73] | Assignee | The Heald Machine Company<br>Worcester, Mass. |

[54] GRINDING MACHINE
5 Claims, 5 Drawing Figs.

| [52] | U.S. Cl. | 51/165.8 |
|---|---|---|
| [51] | Int. Cl. | B24b 49/00 |
| [50] | Field of Search | 51/165 R,<br>165.71, 165.74, 165.75, 165.76, 165.8, 165.9,<br>165.92, 165.93 |

[56] References Cited
UNITED STATES PATENTS

| 3,269,064 | 8/1966 | Lockwood | 51/165.9 X |
|---|---|---|---|
| 3,417,512 | 12/1968 | Robillard et al. | 51/165.91 |

*Primary Examiner*—Lester M. Swingle
*Attorney*—Norman S. Blodgett

ABSTRACT: This invention relates to a grinding machine and, more particularly, to apparatus for generating a surface of revolution by the abrasive process using the controlled-force principle wherein the force is regulated by control of feed using electrical means.

EDWARD G. ROBILLARD
INVENTOR

BY
Norman S. Blodgett

FORCE MODULATION AND SHAPING CIRCUIT

FORCE TRANSDUCER AMPLIFIER AND OUTPUT CIRCUIT 3,601,930

GRINDING MACHINE

BACKGROUND OF THE INVENTION

In the art of grinding, it is well known that there are many advantages to be obtained by using the controlled-force principle, that is to say, by a process in which the grinding machine is operated in such a way that the force is controlled while the rate of feed may vary. This has been accomplished in the past by bringing about feed of the wheel into the workpiece by use of a hydraulic cylinder; the force is controlled by controlling the pressure of fluid supplied to the cylinder. While this method works very well in those situations in which only broad control over the force between the wheel and the workpiece is desired, it is difficult to change the oil pressure accurately and rapidly in order to use a closed loop or feedback type of control over the force. There are portions of the grinding cycle (particularly at the extreme end) in which the control of the force along a preselected curve is quite important in order to obtain proper size, geometry, and surface finish. It is not possible to obtain this close control by using a hydraulic cylinder, pressure regulating valve, and/or servo valve. These and other difficulties experienced with the prior art devices have been obviated in a novel manner by the present invention.

It is, therefore, an outstanding object of the invention to provide a grinding machine in which control of the force between the wheel and the workpiece can take place within very close limits.

Another object of this invention is the provision of a grinding machine using an electrical feedback system for the control of the force between the wheel and the workpiece.

A further object of the present invention is the provision of a grinding machine in which the force between the wheel and the workpiece can be accurately regulated by use of simple, rugged apparatus which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the present invention has to do with a grinding machine for generating a surface of revolution on a workpiece. It is provided with a base on which is mounted a workhead for supporting the workpiece for rotation about the axis of the surface of revolution and on which is mounted a wheelhead which rotatably supports a spindle on which an abrasive wheel is mounted. Feed means is provided for bringing about relative movement between the wheelhead and the workhead to cause the wheel to engage the workpiece for a grinding operation and recording means is provided for indicating at all times the size of the wheel for generating a signal indicative thereof. A transducer generates a signal indicative of the force between the wheel and the workpiece and a control receives a signal from the recording means and from the transducer and transmits a command signal to the feed means to adjust the said movement to maintain the said force at a predetermined value commensurate with the size of the wheel.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
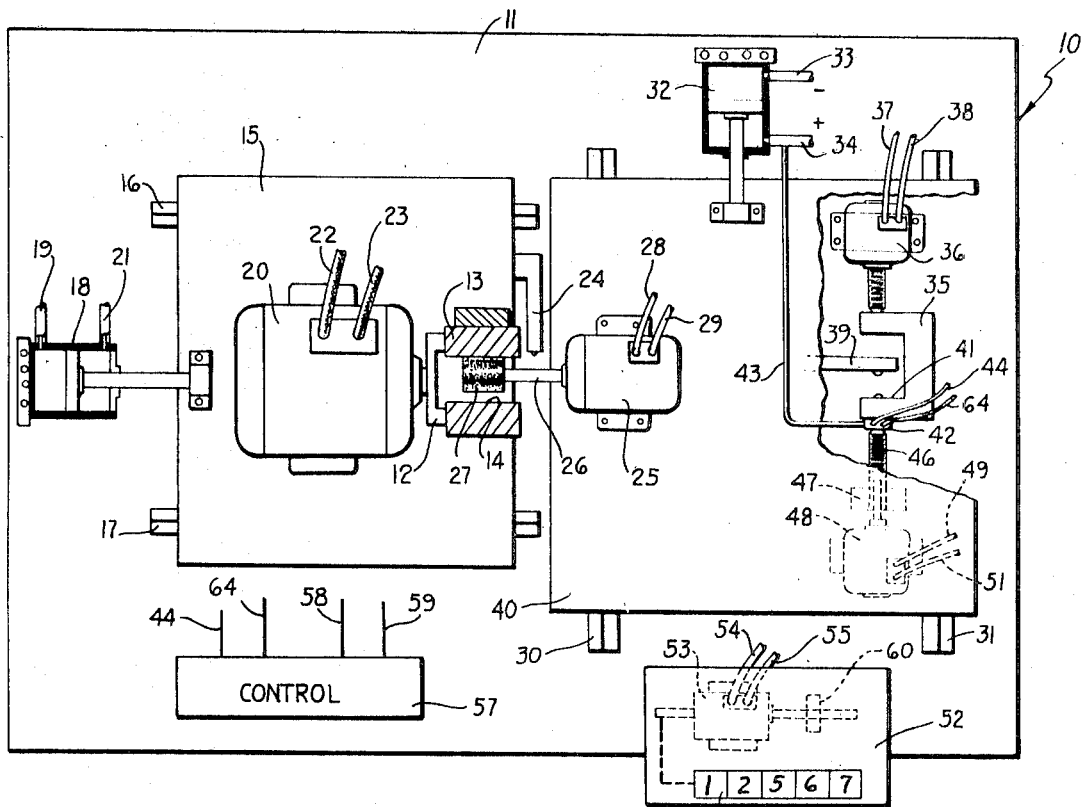
FIG. 1 is a plan, schematic view of a grinding machine embodying the principles of the present invention.

Referring first to FIG. 1, wherein are best shown the general features of the invention, the grinding machine, indicated generally by the reference numeral 10, is shown as having a base 11 on which is mounted a workhead 12. The workhead is constructed to support and rotate a workpiece 13 which has a surface of revolution 14 to be generated by the use of the abrasive process. The workhead is mounted on a table 15 which is mounted on the base 11 on ways 16 and 17 for movement in the direction of the axis of the surface of revolution 14 under the impetus of a hydraulic cylinder 18. The cylinder is connected by conduits 19 and 21 to suitable valving and source of pressure fluid in the usual way to produce reciprocation during the grinding cycle. The workhead 12 contains a suitable motor 20 driven by electrical power supplied through lines 22 and 23. Mounted on the table 15 is a diamond dressing apparatus 24.

Also mounted on the base 11 is a wheelhead 25 rotatably carrying a spindle 26 which has mounted at is outboard end an abrasive wheel 27. The wheelhead 25 contains an electric motor for driving the spindle and wheel, the motor being supplied with electrical power through lines 28 and 29. The wheelhead is mounted on a table 40 which is slidable on ways 30 and 31 transversely of the axis of the spindle 26 and of the axis of the surface of revolution 14. The motion is brought about by a cylinder 32 which is connected by conduits 33 and 34 to the usual valves and source of pressure fluid. Slidably carried on top of the base under the table 40 is a compensation slide 35 which is capable of being moved back and forth transversely of the axis of the spindle 26 by means of a stepping motor 36 operated by electrical pulses received on lines 37 and 38. The table 40 is provided with a horn 39 which, on occasion, acts as a stop in combination with a notch 41 in the compensation slide 35. Mounted at the forward end of the compensation slide 35 (the end opposite the stepping motor 36) is a load cell 42 of the type shown and described in the U.S. Pat. application of Robillard et al. Ser. No. 846,901, filed Aug. 1, 1969. It contains a diaphragm which is maintained under the same pressure as appears in the conduit 34 which is connected to it by conduit 43. The load cell 42 contains strain gages generating a voltage proportional to the force on the diaphragm, which force is transmitted through lines 44 and 64. Pressing against the load cell on the front of the compensation slide 35 is a contact shaft 46 threadedly engaged with a nut 47 fastened to the underside of the table 40. The shaft 46 is rotated by means of a feed stepping motor 48 which receives pulses through lines 49 and 51. Mounted on the base is a recording means 52 for totalizing compensation movements in connection with a particular abrasive wheel 27; this recording means is of the type shown and described in the U.S. Pat. application of Robillard, Ser. No. 720,912, filed Apr. 12, 1968; it contains a stepping motor 53 receiving actuating pulses through lines 54 and 55, these being the same groups of pulses received by the stepping motor 36 through the lines 37 and 38. The stepping motor 53 is connected to operate a mechanical counter 56 giving a visual indication of the amount of the wheel which has been removed by compensation movements and dressing operations by the dressing apparatus 24. The stepping motor 53 also operates the slide contact 60 of a potentiometer, so that the output voltage of the potentiometer is always an indication of the amount of material which has been removed from the wheel in the same manner as the visual counter 56.

Finally, mounted on the base 11 is a control 57 which receives signals on the lines 44 and 64 from the load cell 42 and signals on the lines 58 and 59 originating in the potentiometer in the recording means 52. The output signals from the control operate the cylinder 18 and the cylinder 32 through suitable hydraulic valving, as is well known in the art. It also serves to transmit pulses to the feed stepping motor 48 and to the compensation stepping motor 36.

Figure 2:
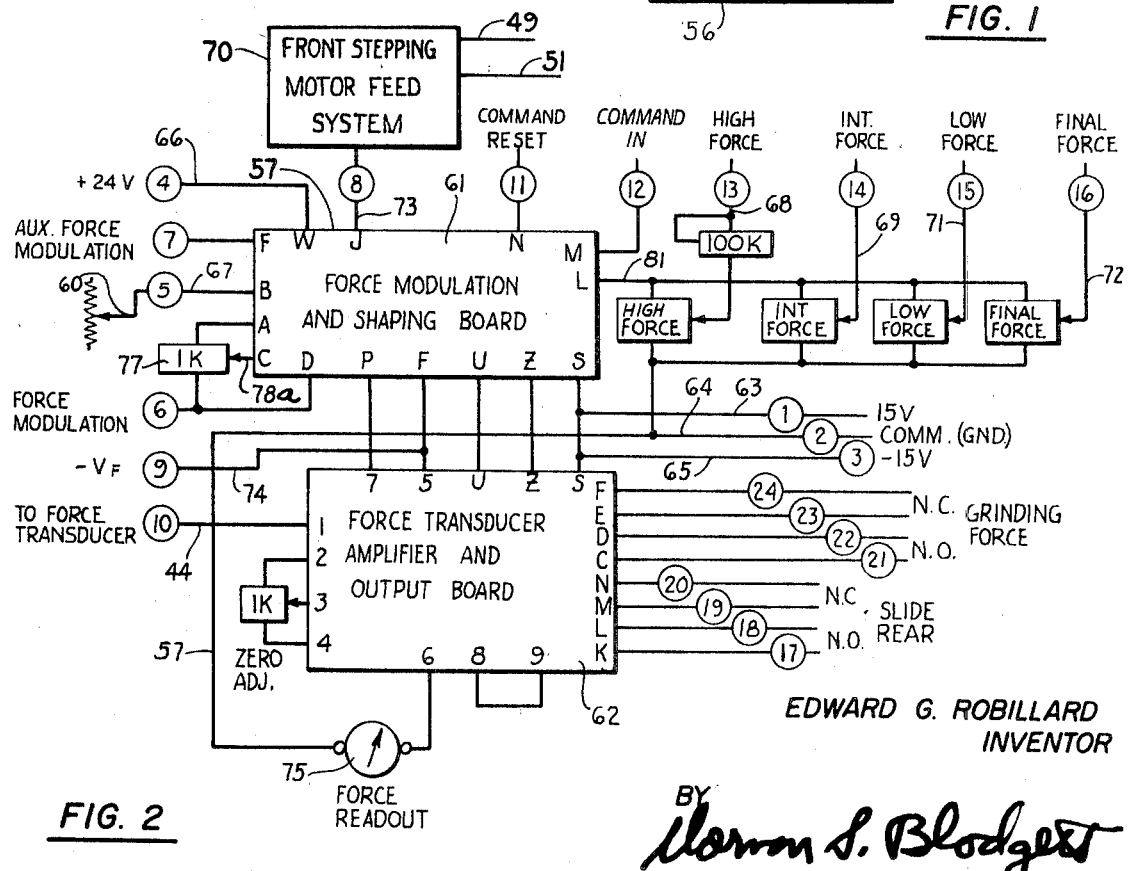
FIG. 2 is an electrical schematic diagram of a control means forming part of the invention.

FIG. 2 shows in a general way the part of the wiring in the control 57 which is directly associated with the present invention. It consists of a force modulation and shaping circuit 61, a force transducer amplifier and output circuit 62, and a front stepping motor feed system 70. Power is introduced into the circuitry through the positive 15 volt line 63, the common or ground line 64, and the negative 15 volt line 65. A positive 24 volt line 66 is connected into the circuit 61. A line 67 is connected to the slide contact 60 of the potentiometer in the recording means 52. Provision is made to select four forces between the wheel and the workpiece; the controls are represented by the output lines 68, 69, 71, and 72 and they represent the high force, the intermediate force, the low force, and the final force, respectively. A line 73 leads to the feed system 70 which generates a frequency of pulses equivalent to the voltage appearing on the line 73. A line 74 having a voltage indicative of the desired force is connected to both circuits 61 and 62. The line 44 from the load cell is connected to the circuit 62 as is a force readout gage 75.

Figure 3:
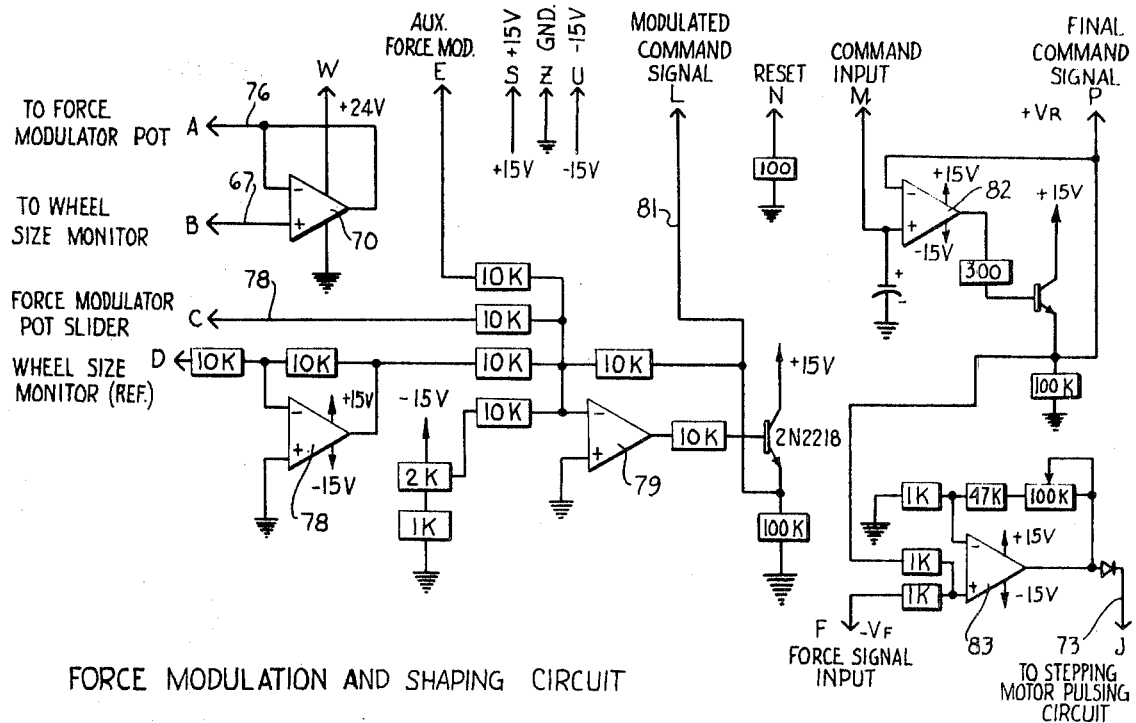
FIG. 3 is a force modulation and shaping circuit forming part of the invention.

In FIG. 3, it can be seen that the wheel size monitor voltage derived from the recording means and appearing on the line 67 is presented to an operational amplifier 70, which results in a signal on a line 76 connected to the force modulator potentiometer 77 (see FIG. 2). A line 78a is connected to the slider on the potentiometer 77 and is associated with operational amplifiers 78 and 79. The output of the amplifiers 78 and 79 appears on the line 81 leading to the force lines 68, 69, 71, and 72. The operational amplifiers 82 and 83 generate a signal to be carried on to the line 73 leading to the pulsing circuit.

Figure 4:
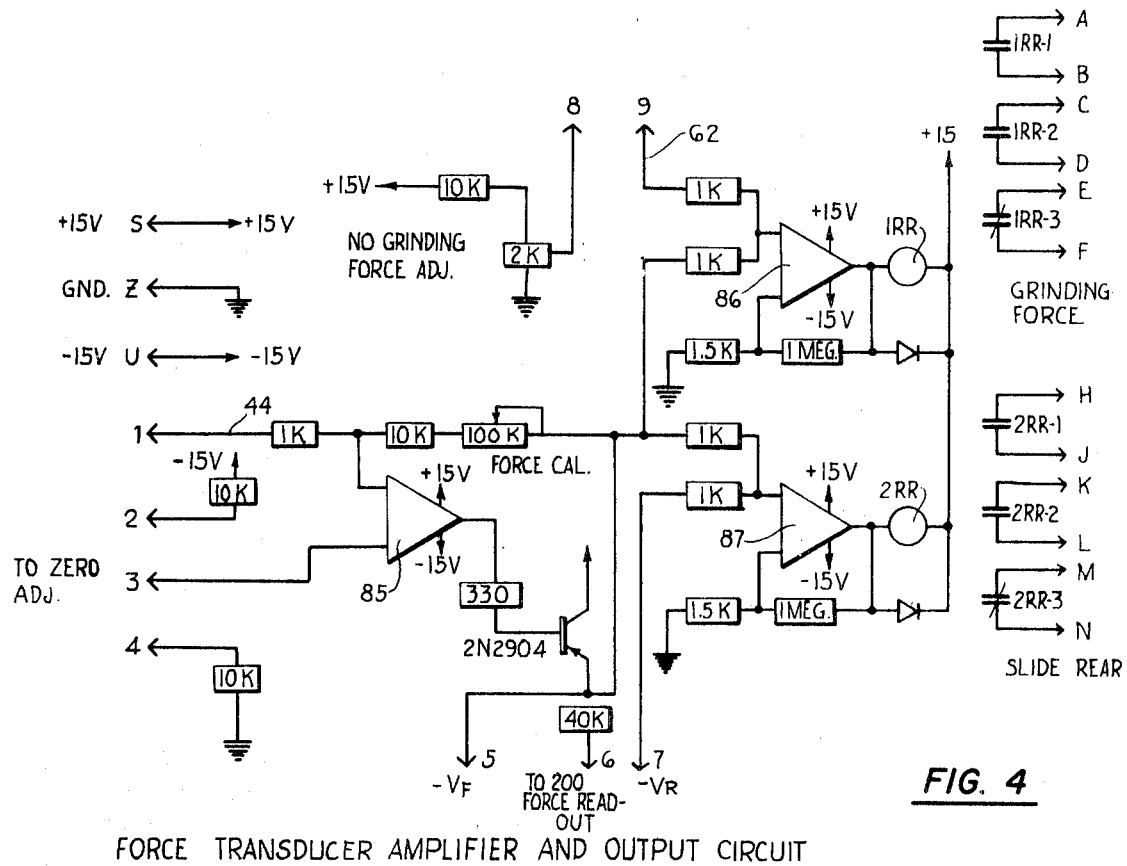
FIG. 4 is an electrical schematic diagram of a force transducer amplifier and output circuit forming part of the invention.

FIG. 4 is a circuit containing three operational amplifiers 85, 86, and 87. The amplifier 86 is operational to operate the coil of the relay 1RR, while the amplifier 87 operates the coil of the relay 2RR.

Figure 5:
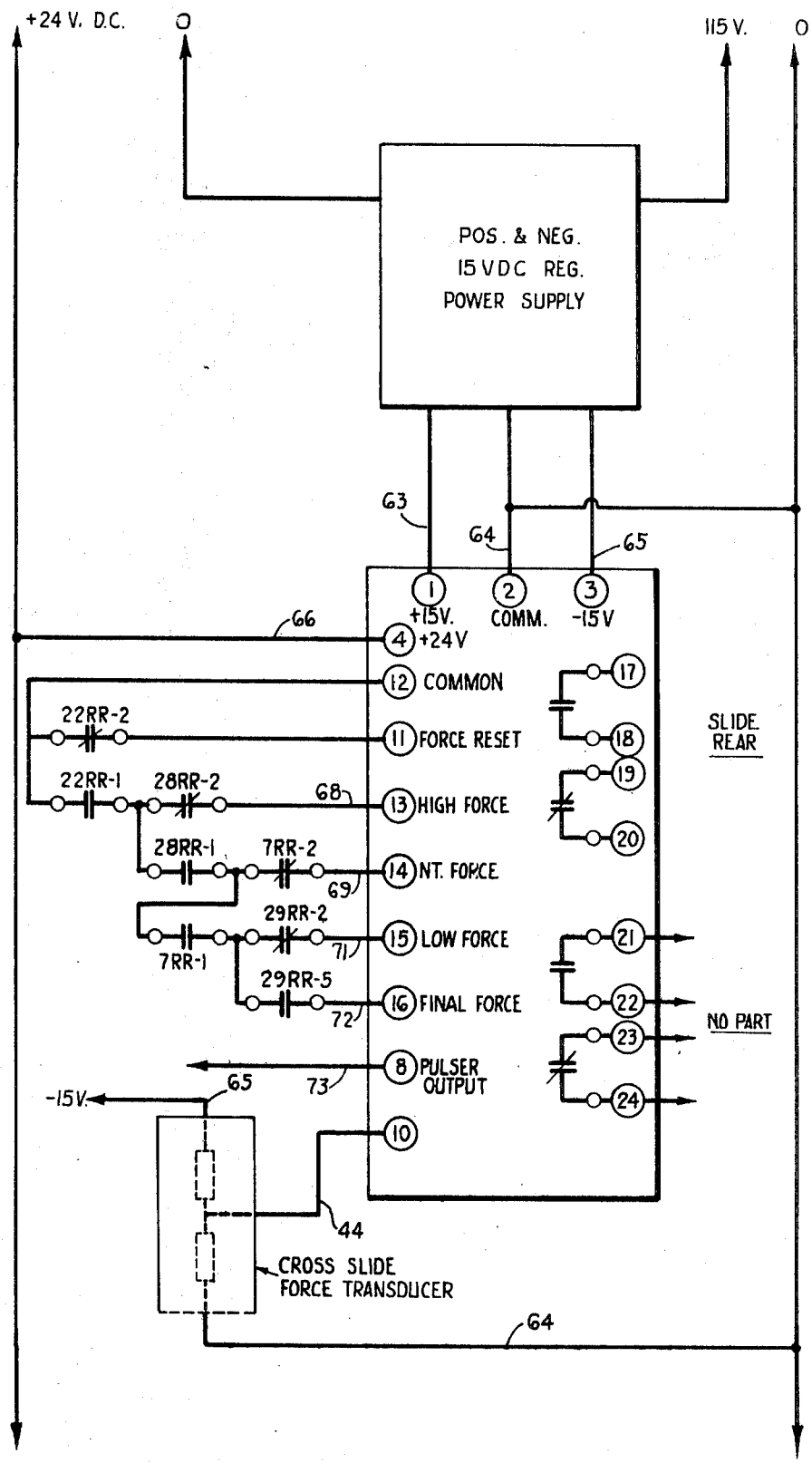
FIG. 5 is an electrical schematic diagram of the connections between the electrical circuits shown in FIGS. 3 and 4 and the other electrical controls of the machine.

FIG. 5 shows the manner in which the circuits shown in FIGS. 3 and 4 are connected to other electrical control elements of the machine.

The operation of the invention will now be readily understood in view of the above description. The control 57 carries the table 15 with the workhead 12 and the table 40 with the wheelhead 25 in their respective longitudinal and transverse motions in the usual way used in an abrasive grinding cycle. The cylinder 32 acts to keep the table 40 moved rearwardly; that is to say, toward the direction in which the abrasive wheel 27 engages the surface 14 of the workpiece 13. It is prevented from moving to total unrestricted engagement by the contact of the shaft 46 with the end of the compensation slide 35 and the load cell 42. The control operates the stepping motor 48 to back the shaft 46 away through the medium of the nut 47, there being a slip joint between the shaft of the stepping motor 48 and the shaft 46 to allow for this motion. As the shaft 46 backs off, the table 40 is allowed to move rearwardly also, but at a rate determined by the rate of pulses received on the lines 49 and 51 by the motor 48. The recording means 52 at any given time records on the visual indicator 56 the exact amount of the wheel which has been dressed off in the past, so that the size of the wheel is indicated by a reference voltage arriving from the slide contact 60 of the potentiometer in the recording means, which potentiometer is moved, of course, by the stepping motor 53. This voltage gets smaller and smaller as the wheel gets smaller, and this reference voltage is compared in the circuit shown in FIG. 4 with the actual force between the wheel and the workpiece as indicated by the load cell 42. Any difference in voltage is fed back into the pulsing circuit and results in a lower frequency; that is to say, the shaft 46 is allowed to feed toward the front of the machine at a slower rate, thus allowing the table 40 to move rearwardly at a slower rate, which means that the force between the abrasive wheel 27 and the workpiece 13 will be reduced. It can be seen, then, that, as the wheel gets smaller (which means that the wheel is capable of cutting faster, since the area of contact between the wheel and the workpiece is smaller), a given force presents a higher force intensity and, with a given force, would result in more rapid cutting. This has the effect of destroying the finish on the workpiece. Also, it affects size, geometry, and so on. With the present device, it is, however, possible to select a force for each size of the wheel which will cause the wheel to operate most effectively in the grinding operation and the above-described deficiencies will not exist.

It is obvious that minor changes may be made in the form and construction of the invention without departing from the material spirit thereof. It is not, however, desired to confine the invention to the exact form herein shown and described, but is is desired to include all such as properly come within the scope claimed.

The invention having been thus described, what is claimed as new and desired to secure by Letters Patent is:

1. A grinding machine for generating a surface of revolution on a workpiece, comprising
   a. a base,
   b. a workhead mounted on the base for supporting the workpiece for rotation about the axis of the surface of revolution,
   c. a wheelhead mounted on the base and rotatably supporting a spindle on which an abrasive wheel is mounted,
   d. feed means for bringing about relative movement between the wheelhead and the workhead to cause the wheel to engage the workpiece for a grinding operation,
   e. recording means for indicating at all times the size of the wheel and generating a signal indicative thereof,
   f. a transducer generating a signal indicative of the force between the wheel and the workpiece, and
   g. a control receiving a signal from the recording means and from the transducer and transmitting a command signal to the feed means to adjust the said movement to maintain the said force at a predetermined value commensurate with the size of the wheel.

2. A grinding machine as recited in claim 1, wherein the recording means includes a stepping motor which receives successive signals indicative of the amount of wheel dress and stores the accumulated sum of the signals and includes a potentiometer driven by the stepping motor whose voltage output is always proportional to the said accumulated sum.

3. A grinding machine as recited in claim 2, wherein the transducer consists of a strain gage inserted between the wheelhead and the base to generate an electrical signal indicative of the grinding force.

4. A grinding machine as recited in claim 3, wherein the feed means consists of a stepping motor, wherein the control consists of a pulse generator transmitting pulses to the feed stepping motor, and wherein the signal from the potentiometer is connected to the pulse generator to modulate the frequency of pulse generation in accordance with the size of the abrasive wheel.

5. A grinding machine as recited in claim 4, wherein a compensation apparatus including a stepping motor and compensation slide is interposed between the feed stepping motor and the base, wherein the compensation stepping motor receives a group of pulses on occasion from the pulse generator, the same group of pulses being transmitted to the stepping motor of the recording means.